United States Patent [19]

Schaefer

[11] Patent Number: 4,628,236
[45] Date of Patent: Dec. 9, 1986

[54] ELECTRIC MOTOR CONTROL
[75] Inventor: Edward J. Schaefer, Bluffton, Ind.
[73] Assignee: Franklin Electric Co., Inc., Bluffton, Ind.
[21] Appl. No.: 821,777
[22] Filed: Jan. 23, 1986

Related U.S. Application Data

[63] Continuation-in-part of Ser. No. 632,955, Jul. 20, 1984, abandoned.

[51] Int. Cl.[4] .............................................. H04R 11/02
[52] U.S. Cl. ................................... 318/558; 361/399; 310/68 A; 174/52 R
[58] Field of Search ....................... 361/395, 399, 334; 310/71, 68 A, 68 B; 174/52 R; 318/786, 558, 481

[56] References Cited

U.S. PATENT DOCUMENTS

| | | | |
|---|---|---|---|
| 2,847,497 | 8/1958 | Appleton et al. | 174/52 R |
| 4,307,327 | 12/1981 | Streater et al. | 318/786 |
| 4,339,231 | 7/1982 | Conery et al. | 310/71 X |
| 4,390,219 | 6/1983 | Beehler | 310/71 X |
| 4,462,758 | 7/1984 | Speed | 200/83 R |
| 4,463,304 | 7/1984 | Miller | 318/786 X |
| 4,504,697 | 3/1985 | Chapin et al. | 172/52 R |

Primary Examiner—B. Dobeck
Attorney, Agent, or Firm—Marshall, O'Toole, Gerstein, Murray & Bicknell

[57] ABSTRACT

This disclosure relates to an electric motor control designed for attachment to a support wall or to a pressure switch. The control comprises a support having a base portion and a mounting portion. The base portion has a plurality of electrical terminals attached thereto and has at least one lead opening formed therein for electrical leads. The mounting portion has a lead opening formed therein. A motor control switch including a plurality of electrical terminals is connected to the terminals of said base portion. The mounting portion includes first means for attaching the support to a pressure switch and second means for attaching the mounting portion to a support wall. A cover is removably attached to the base portion, and the control switch is mounted in the cover.

16 Claims, 10 Drawing Figures

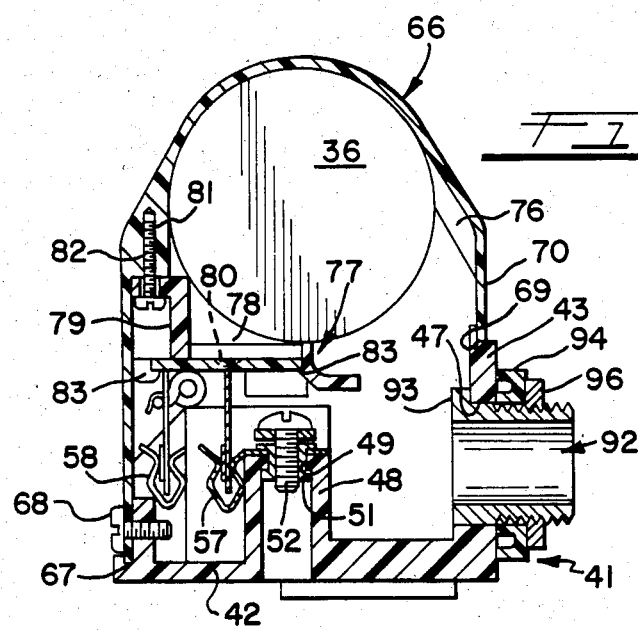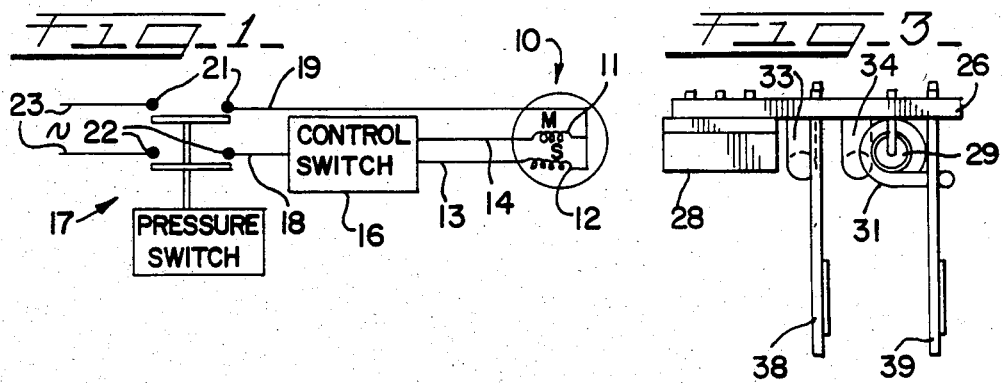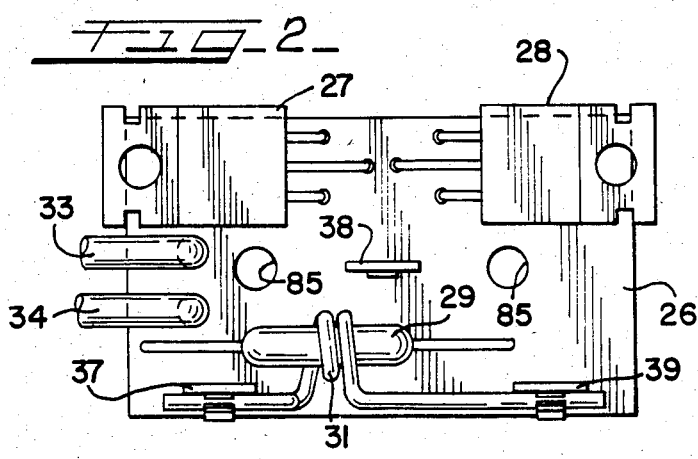

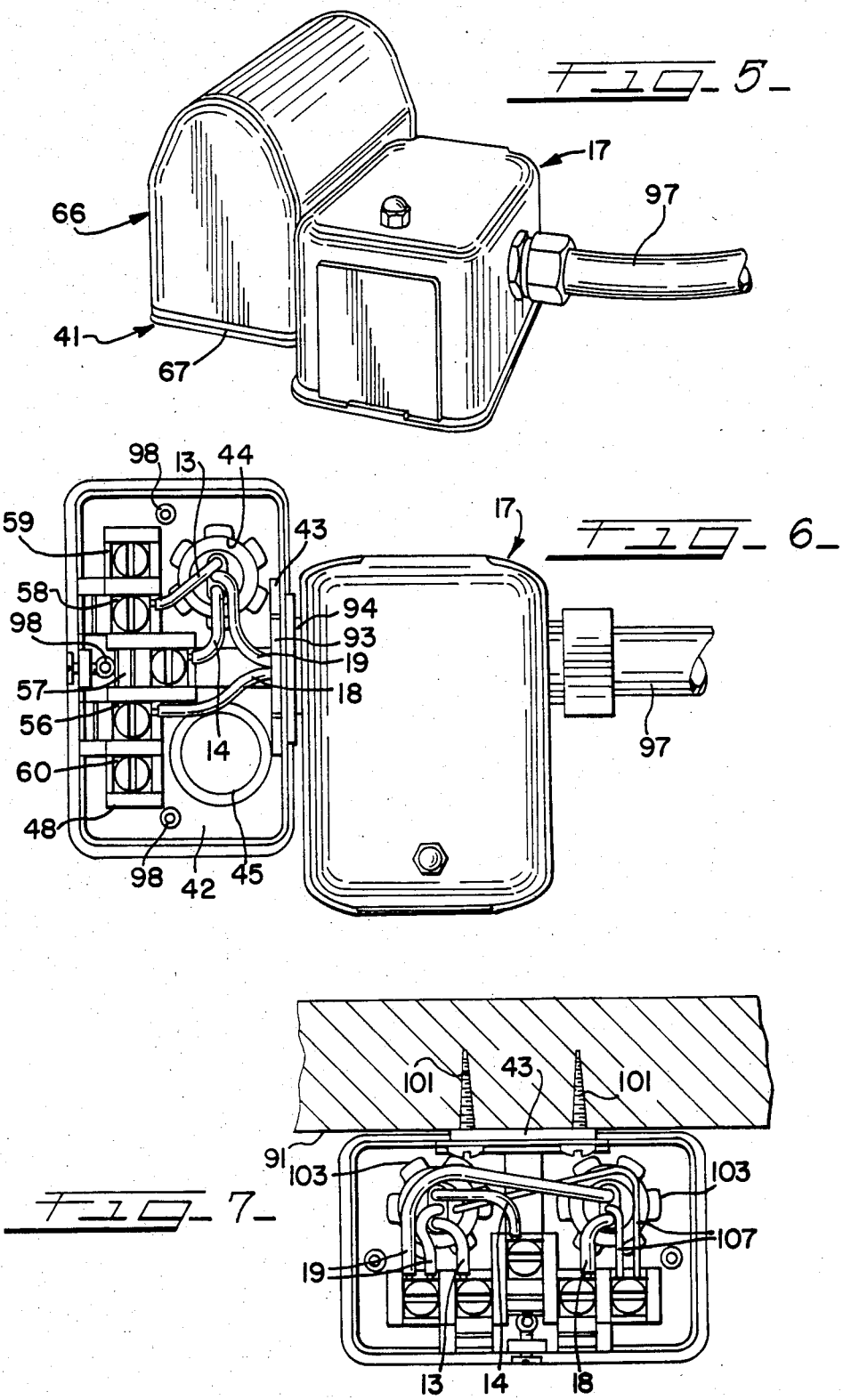

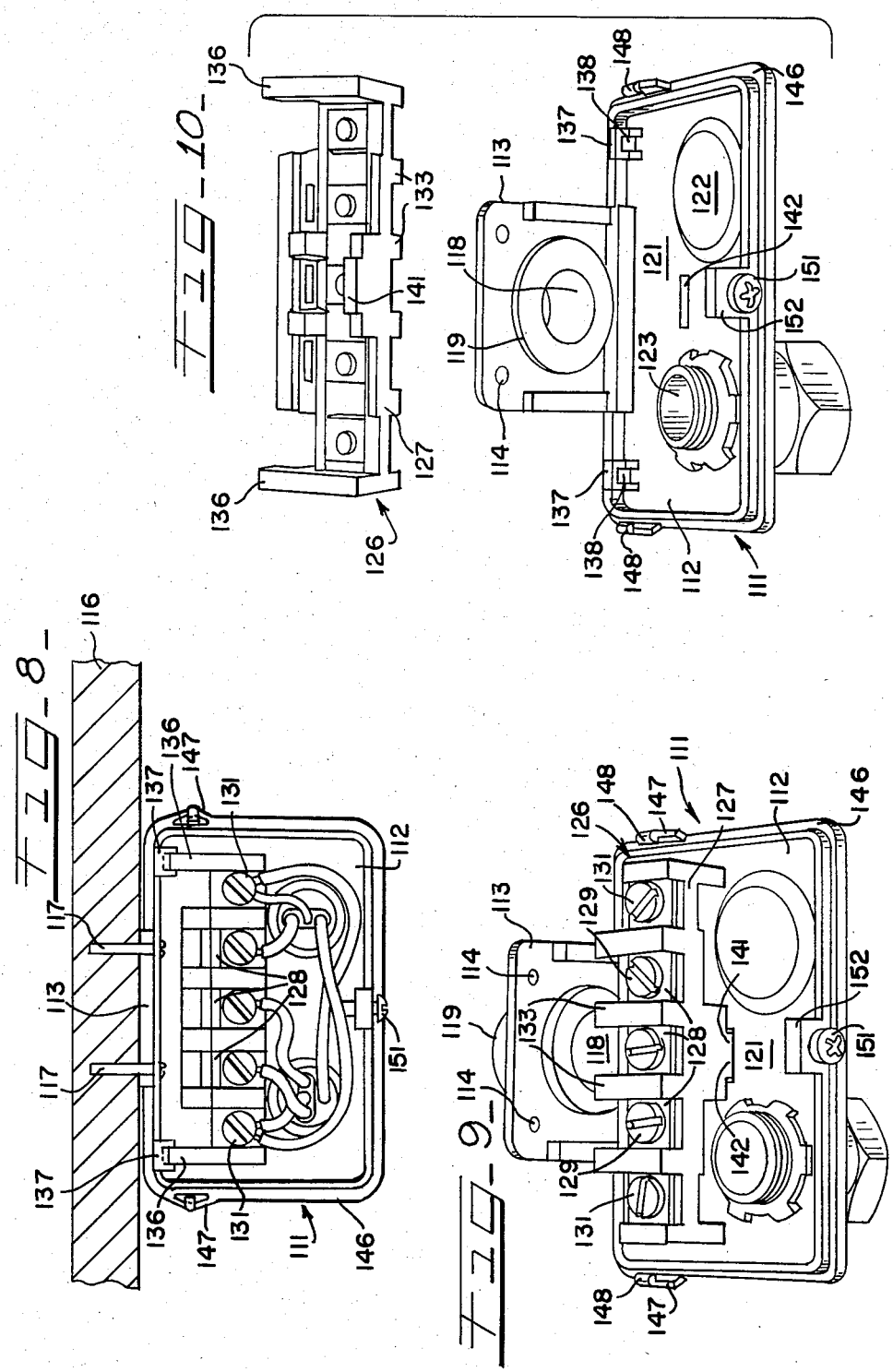

ELECTRIC MOTOR CONTROL

RELATED APPLICATION

This application is a continuation-in-part of application Ser. No. 632,955 filed July 20, 1984 now abandoned.

BACKGROUND OF THE INVENTION

This invention relates to a control for an electric motor of a well pump, such as a water well pump, for a rural residence. Conventional well pumps of this nature include an electric motor driven pump installed in the well, the pump being connected by pipes to a water storage tank which in turn is connected to the water distribution system of the residence. A typical prior art pump control includes a pressure switch that is connected to the pipes and responds to the water pressure in the storage tank, and the switch turns the motor on and off to maintain the water pressure in the tank within a preset pressure range. The electric motor is usually a single phase type, and the control further includes a start winding control switch along with, in the case of a capacitor start motor, a capacitor.

In some prior art controls of this nature, it is preferably that the parts of the control be separated. For example, the pressure switch has been at one location and the motor start winding control switch and the capacitor have been at a different location. Another arrangement is shown in the R. H. Speed U.S. Pat. No. 4,462,758 dated Jul. 31, 1984, wherein the pressure switch and the start winding control switch are fastened together and enclosed by a single housing.

The prior art controls, as described above, have the disadvantage that they are designed either for mounting at different locations or for mounting together.

It is an object of this invention to provide a control wherein the parts may be located together or at different locations, as required. The control further is rugged, electrical connections are easily performed, and the start winding control switch is easily removed and replaced.

SUMMARY OF THE INVENTION

An electric motor control in accordance with this invention is designed for attachment to a support wall or to a pressure switch, and comprises a support having a base portion and a mounting portion. The base portion has a plurality of electrical terminals attached thereto and has at least one lead opening formed therein for electrical leads. The mounting portion has a lead opening formed therein. A motor control switch including a plurality of electrical terminals is connected to the terminals of said base portion. The mounting portion includes first means for attaching the support to a pressure switch and second means for attaching the mounting portion to a support wall.

BRIEF DESCRIPTION OF THE DRAWINGS

The foregoing and other objects and advantages of the invention will become more apparent from the following detailed description taken in conjunction with the accompanying figures of the drawings, wherein:

FIG. 1 is an electrical schematic diagram of a well pump motor system including a control in accordance with the present invention;

FIG. 2 is a plan view of a printed circuit switch board of the control;

FIG. 3 is an end view of the board shown in FIG. 2;

FIG. 4 is a sectional view of a control in accordance with the present invention;

FIG. 5 is a perspective view of the control fastened to a pressure switch;

FIG. 6 is another view of the structure shown in FIG. 5 but with a cover of the control removed;

FIG. 7 is a view of the control, with the cover removed, fastened to a mounting surface such as a wall.

FIG. 8 is a view similar to FIG. 7 but showing a preferred form of the invention;

FIG. 9 is a perspective view of the form shown in FIG. 8; and

FIG. 10 is an exploded view showing two parts of the form shown in FIGS. 2 and 9.

DETAILED DESCRIPTION OF THE DRAWINGS

With reference first to FIG. 1, a motor circuit in accordance with this invention includes a single-phase induction motor 10 including a main winding 11 and a start winding 12. The two windings 11 and 12 are connected by two motor leads 13 and 14 to a start winding control switch 16. A pressure switch 17 is connected by one lead 18 to the control switch 16 and by another lead 19 to the motor windings 11 and 12. The pressure switch 17 includes contacts 21 and 22 which are connected to power leads 23, the leads 23 being adapted to be connected to a conventional ac power supply.

The pressure switch 17 may be a conventional type, such as that shown in U.S. Pat. No. 3,340,372 which is manufactured by Square D company and marketed as their product No. FSG2 pressure switch. The pressure switch is connected to sense the water pressure in a storage tank (not shown) and to close the contacts 21 and 22 when the pressure level is at a preset minimum and to open the contacts when the pressure is at a preset maximum.

The start winding control switch 16 may also be a conventional type, such as the switch shown in the A. L. Streater U.S. Pat. No. 4,307,327, or in the T. A. Miller U.S. Pat. No. 4,463,304. In the present instance, the control circuit shown in the Miller patent is illustrated in the drawings.

In the operation of the system shown in FIG. 1, the power leads 23 are connected to a power supply and the pressure switch 17 is connected to sense the water pressure. When the pressure drops to a preset low value, the pressure switch contacts close. At startup, the control switch 16 connects the power supply to both the main and start windings 11 and 12. When the speed of the motor is close to the running speed, the switch 16 automatically operates to disconnect the start winding 12. The motor then continues to run on the main winding. The motor is, of course, connected to drive a pump (not shown) which pumps water into the storage tank until the pressure in the tank reaches the upper preset value, at which time the pressure switch 17 automatically operates to open the contacts 21 and 22 and thereby de-energize the motor 10. The foregoing cycle is repeated whenever the water pressure drops.

With reference to FIGS. 2 and 3, the motor start winding control switch 16 is mounted on a relatively flat, rectangular printed circuit board 26. The control switch includes two triacs 27 and 28, a reed switch 29 and a coil 31 which is wound around the reed switch 29.

Two wires 33 and 34 connect the printed circuit board 26 with a start capacitor 36 shown in FIG. 4. As shown and described in the above-mentioned Miller patent, the two triacs 27 and 28, the start winding 12 and the capacitor 36 are connected in series across the power leads. The gates or controls of the two triacs are connected to opposite sides of the reed switch, and the coil 31 is connected in one of the power leads so that the start and main winding currents flow through the coil 31. The disclosure of the Miller patent is incorporated herein by reference.

The control further includes a support 41 on which is mounted a cover 66 and the control switch 16. Interconnected electrical terminals are mounted on the support 41 and on the circuit board 26. While various types of connections may be used, in the present example quick connect terminals are provided. The printed circuit board 26 further includes three quick connect terminal prongs 37, 38 and 39, which are also shown in FIG. 3. The two prongs 37 and 39 are connected to opposite ends of the coil 31. As shown in FIG. 4, the prongs 37-39 mate with and connect to receptacle quick connect terminals mounted on the support 41.

With reference to FIGS. 4 and 6, the support 41, which may be formed of molded plastic, includes a flat, generally rectangular base 42 and an upstanding mounting part 43 that is at a substantially right angle to the base 42. The base 42 has at least one lead opening formed in it, and in the present example two lead openings 44 and 45 (FIG. 6) are formed therein, and the mounting part 43 has a single hole 47 formed therein. As shown in FIG. 6, the mounting part 43 does not extend for the entire length of the base 42 and it is located, in the present example, at approximately the midpoint of the length of the base 42.

The base 42 has the receptacle quick connect terminals mounted thereon. To this end, the base 42 has a plurality of steps or ledges 48 formed on the upper or same side as the mounting part 43. In the present instance, five ledges 48 are provided, each ledge having a hole 49 formed in its upper surface. An internally threaded clamp rivet 51 is secured in each hole 49. A terminal screw 52 is threaded into each rivet 51 and may be utilized, as shown in FIGS. 6 and 7, to secure leads or wires to the terminals.

The three centermost ledges 48 are also provided with receptacle quick connect terminals 56, 57 and 58. As shown in FIG. 4, the three prongs 37, 38 and 39 of the switch board are located to connect with the three receptacle terminals 56, 57 and 58 of the support 41. The two outermost ledges 48 of the support have lead clamps 59 and 60 under the screws 52.

The control further includes the previously mentioned cover 66 (FIGS. 4 and 5) which may also be formed of molded plastic. The cover 66 forms an enclosure having an open bottom, and the bottom edge is turned outwardly to form a rim 67 (see FIG. 5). The bottom edge of the cover has a configuration that conforms to the contour of the support 41, as shown in FIGS. 4 and 5. When the cover is positioned on the upper side of the terminal base, they may be secured together by a screw 68 that extends through a slot formed in the cover and is threaded into a hole formed in the support 41. The cover 66 has the shape of an inverted U in cross section, and its side 70 which is adjacent the mounting part 43, has a cutout 69 formed therein which engages the outside edge of the mounting part 43.

The capacitor 36 in this example has a cylindrical shape and it is mounted within the upper side of the cover 66, and the upper side of the cover is preferably curved or shaped to conform to the curvature of the cylindrical capacitor 36, as shown in FIG. 4. Ribs 76 are preferably molded on the inside of the cover 66 which serve both to strengthen the cover and to engage and hold the capacitor 36 against movement within the cover.

The capacitor 36 is held in position in the upper side of the cover 66 by a printed circuit board mounting bracket 77 (FIG. 4). The bracket 77 has a right angle shape, one arm 78 of the bracket extending under and engaging the bottom side of the capacitor 36. The second arm 79 of the bracket 77 engages a ledge 81 of the cover and a screw 82 firmly secures the bracket 77 to the inside of the cover 66. On the underside of the bracket 77 are formed a plurality of tabs 83 which engage and hold the edges of the printed circuit board 26. As shown in FIG. 4, the board 26 is located between the tabs 83 and the tabs are flexible so that they may be bent outwardly slightly to permit the board 26 to be mounted in or removed from the cover. Further, the bracket 77 preferably has two rounded protrusions 80 formed on its underside which extend into openings 85 (FIG. 2) formed in the board 26 in order to center or properly mount the board on the bracket. When so mounted, the three prongs 37–39 are located to engage the receptacles 56–58, as previously described, when the cover 66 is moved downwardly relative to the support 41 and tightly engaged with the base 42, as shown in FIG. 4.

The control is designed to be fastened either directly to the pressure switch 17, as shown in FIGS. 5 and 6, or to be mounted against a mounting surface 91, such as a wall, as shown in FIG. 7, at a location which is displaced from the pressure switch 17. In both types of installation, the motor leads 13, 14 and 19 extend through the hole 44 formed in the base 42 of the support 41.

With reference first to the mounting shown in FIGS. 5 and 6, the control is fastened to the pressure switch 17 by a short bushing 92 (FIG. 4) that is positioned through the hole 47 formed in the mounting part 43. The bushing 92 has an enlarged head or flange 93 which engages the inside surface of the mounting part 43. An annular spacer 94 is located around the shank of the bushing 92 and engages the outside surface of the mounting part, and a jam nut 96 is threaded on the outer threaded end of the bushing 92.

The standard pressure switch 17 is provided with two power lead conduit holes, one on each side of the switch as shown in FIG. 6. With the nut 96 removed, the outer threaded end of the bushing 92 is positioned through one of the pressure switch holes and the jam nut 96 is utilized to secure the bushing and the support 41 to the side of the pressure switch. The spacer 94 is located between the mounting part 43 and the pressure switch. The two power leads 23 are connected to the pressure switch 17 through a conduit 97 which is connected to the other hole of the pressure switch. As shown in FIG. 6, the two leads 18 and 19 extend through the bushing 92 and the lead 18 is connected to the terminal 56. One of the prongs 37–39 thus connects with the terminal 56 in order to connect the lead 18 with the start winding control switch on the board 26. The motor leads 13 and 14 are connected to the other two terminals 57 and 58 and, of course, are also connected to the start winding control switch. The lead 19 extends directly from the pressure switch to the motor, as shown in FIGS. 1 and 6.

Thus, the support 41 is secured to the side of the pressure switch 17 and the electrical leads, when the cover 66 is removed, may be readily attached to the terminals 56–58 and to the motor and the pressure switch. The cover 66 is then moved downwardly over the top of the support 41 and the electrical connections to the start winding control switch and to the capacitor are automatically made when the quick connect terminals are engaged. The screw 68 is then secured to hold the cover on the base 42.

A plurality of holes 98 (FIG. 6) are preferably formed through the base 42, which are provided to allow drainage of any condensation water that collects inside of the control enclosure. In the case of controls which may be mounted at locations where they are exposed to outside moisture, such condensation or moisture may collect, and the holes 98, which are normally at the lowest part of the control, permit the moisture to leak out.

When the control is to be fastened to a mounting surface 91 such as a wall, as shown in FIG. 7, the bushing 92, the spacer 94 and the jam nut 96 are discarded and the mounting part 43 is positioned directly against the surface 91. The part 43 has screw holes formed in it and suitable screw fasteners 101 are employed to firmly secure the part 43 to the surface 91. The hole 47 in the part 43 is, of course, blocked by the surface 91, and the electrical leads connecting the terminals with the pressure switch are passed through the hole 45 formed in the base 42. The conduit through which the leads extend are secured in place by jam nuts 103. Ground wires 107 are connected to the nearest grounded power line connector. If the control is mounted on the pressure switch, the ground wires are connected to ground in the pressure switch enclosure; if the control is mounted on a separate wall supporting surface, the ground wires are connected to the nearest ground.

It will be apparent from the foregoing that the mounting part 43 of the support 41 is adaptable to being mounted either directly on a pressure switch, as shown in FIGS. 5 and 6, or on a separate supporting surface such as a wall as shown in FIG. 7, as required to suit a specific installation. In either arrangement, the connections are readily made to the terminals on the base 42 because the terminals are exposed when the cover is removed, and the electrical connections are automatically made to the start winding control switch when the cover is attached to the base. The capacitor and the start winding control switch may be easily removed for repair or replacement without disturbing the electrical connections to the motor and the pressure switch. The printed circuit mounting bracket both supports the printed circuit board and it also holds the capacitor in place. Further, the components on the printed circuit board are held away from the capacitor, so that any heat produced by the capacitor during motor operation will not change the calibration of the start winding control switch.

FIGS. 8 to 10 show a preferred embodiment of the invention, which further simplifies the connection of the wires to the terminals. This control comprises a support 111 including a base 112 and a mounting part 113 which are generally similar to the base 42 and the part 43. The part 113 has screw holes 114 for attachment to a wall 116 (FIG. 8) using screws 117, and a larger hole 118 (corresponding to the hole 47) that receives a bushing 119 for attachment to a pressure switch as shown in FIGS. 5 and 6.

The base 112 includes a generally flat central portion 121 (FIG. 10) that has at least one lead opening formed in it. In the present example, two lead openings 122 and 123 are provided. The lead openings 122 and 123 are at the opposite edge of the base from the mounting part 113, and a detachable terminal board 126 is clipped onto the base 112 between the part 113 and the openings. The board 126 includes an elongated mounting portion 127 that has a plurality of electrical terminals fastened to it; in the present example, three quick connect receptacles 128 are mounted on the portion 127, similar to the receptacles shown in FIGS. 4 and 6, for connection to prongs on the printed circuit board. It should be understood, however, that a different number and different kinds of terminals could be provided. For example, ordinary leads and screw-type terminals could be used to make connections to the printed circuit board. Each of the receptacles 128 is electrically connected to a screw terminal 129, and two additional screw terminals 131 are also mounted on the mounting portion 127, similar to the first described form of the invention. The portion 127 is made of an electrical insulating material such as molded plastic, and walls 133 are preferably provided between adjacent terminals.

As previously mentioned, the terminal board 126 is detachably connected to the support 111. At the outer ends of the mounting portion are formed prongs 136 which extend from the mounting portion 127 in the direction of the side adjacent the part 113. Two upwardly projecting bosses 137 (FIG. 10) are formed on the base 112 and a recess 138 is formed in each boss 137. Each of the prongs 136 is insertable into one of the recesses 138 as shown in FIG. 8, thereby holding one side of the terminal board in place on the support 111.

The other side of the terminal board is held by a projection 141 which fits into a slot 142 formed in the center area of the base 12. To attach the terminal board to the base 112, the prongs 136 are inserted into the recesses 138 and then the projection 141 is pressed into the slot 142. Of course, the board 126 is detached by the reverse movement.

The electrical leads to the terminal board 126 may be routed as shown in FIG. 6 or in FIG. 7, depending on how the support 111 is mounted, as previously described. The connections to the screw terminals 129 and 131 may be performed with the board 126 clipped to the support 111 as shown in FIG. 9 or when the board 126 is detached from the support. In the latter instance, the board is clipped to the support after the electrical connections have been made. Consequently an electrician has a choice of two methods of wiring the control.

The control further includes a cover which is similar to the cover 66. The base 112 has a ledge 146 formed around its outer periphery, and the bottom edge of the cover is shaped to rest on the ledge 146. The base 112 includes two clips 147 for releasably holding the cover on the support 111. As previously mentioned, the lower edge of the cover includes an outwardly extending rim 67, and each clip 147 has a hook 148 on its upper end which engages and holds the rim. In addition, a screw 151 and a fastening post 152 are provided for securing the cover to the base (see the screw 68 arrangement shown in FIG. 4). The two clips 147 are flexible so that they may be bent outwardly to permit assembly or disassembly of the cover with the support 111.

It will be apparent that the construction shown in FIGS. 8-10 has the advantages and features of the construction shown in FIGS. 1-7, plus the advantages of offering two modes of making the electrical connections to the terminal board and of providing a more secure attachment of the cover to the support.

What is claimed is:

1. An electric motor control for attachment to a support wall or to a pressure switch, comprising a support having a base portion and a mounting portion, said base portion having a plurality of first electrical terminals attached thereto and having at least one lead opening formed therein for electrical leads, said mounting portion having a first hole formed therein, a motor control switch including a plurality of second electrical terminals connected to said terminals of said base portion, said mounting portion including first means for attaching said support to a pressure switch and second means for attaching said mounting portion to a support wall.

2. A control according to claim 1, wherein said first means comprises a first fastener positioned in said first hole formed in said mounting portion and adapted to be attached to the pressure switch.

3. A control according to claim 2, wherein said first fastener comprises a threaded bushing positioned in said first hole and a nut threaded on said bushing.

4. A control according the claim 1, wherein said second means comprises a second hole formed in said mounting portion, and a second fastener positioned in said second hole and adapted to be attached to the support wall.

5. A control according to claim 4, wherein said second hole is a screw hole and said second fastener is a screw.

6. A control according to claim 1, and further including a removable cover positioned on said base portion and enclosing said terminals and said motor control switch.

7. A control according to claim 6, and further including releasable means on said cover and on said base portion for detachably connecting said cover to said base portion.

8. A control according to claim 6, wherein said control switch and said second electrical terminals are mounted to said cover.

9. A control according to claim 8, wherein said first and second electrical terminals are quick-connect terminals.

10. A control according to claim 9, wherein said switch comprises a circuit board having said second electrical terminals fastened thereto, and further including a bracket fastened to the inside of said cover, said board being fastened to said bracket.

11. A control according to claim 10, wherein said bracket includes tabs for releasably engaging said board, and centering means for locating said board on said bracket.

12. A control according to claim 10, wherein said switch further comprises a capacitor positioned in one side of said cover, said bracket engaging said capacitor and holding said capacitor in said one side.

13. A control according to claim 6, wherein said mounting portion forms a substantially right angle with said base portion, and said cover fits snugly around the edges of said mounting portion and said base portion.

14. A control according to claim 1, and further comprising a terminal block on said base portion, said first electrical terminals being fastened to said terminal block.

15. A control according to claim 14, wherein said terminal block is removable from said base portion, and further including means for releasably attaching said block to said base portion.

16. An electric motor control for mounting on a support wall or a pressure switch, comprising:
 (a) a support including a base portion and a mounting portion extending at a substantially right angle to each other, a terminal block and a plurality of quick connect terminals mounted on said base portion, said base portion having at least one lead opening therein and said mounting portion having a hole therein;
 (b) a cover removably attached to said base portion and enclosing said terminals, said cover extending closely adjacent the edges of said mounting portion;
 (c) a motor control switch enclosed by said cover, said switch including a circuit board having quick connect terminals thereon mating with said terminals of said base portion;
 (d) first fastener means connected to said mounting portion for fastening said support to a pressure switch; and
 (e) second fastener means connected to said mounting portion for fastening said support to a support wall.

* * * * *